United States Patent
Wang et al.

(10) Patent No.: US 8,737,302 B2
(45) Date of Patent: May 27, 2014

(54) METHOD AND SYSTEM FOR PROCESSING TERMINAL MEMBERSHIP BASED ON HYBRID ACCESS MODE CELL

(75) Inventors: Shengming Wang, Shenzhen (CN); Lin Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 29 days.

(21) Appl. No.: 13/259,798

(22) PCT Filed: Aug. 13, 2010

(86) PCT No.: PCT/CN2010/076003
§ 371 (c)(1),
(2), (4) Date: Nov. 30, 2011

(87) PCT Pub. No.: WO2011/035661
PCT Pub. Date: Mar. 31, 2011

(65) Prior Publication Data
US 2012/0201206 A1 Aug. 9, 2012

(30) Foreign Application Priority Data
Sep. 23, 2009 (CN) .......................... 2009 1 0176168

(51) Int. Cl.
*H04W 4/00* (2009.01)
*H04M 3/42* (2006.01)

(52) U.S. Cl.
USPC ........................................ 370/328; 455/414.1

(58) Field of Classification Search
CPC . H04M 2203/2044; H04M 3/42; H04W 4/08; H04W 84/042
See application file for complete search history.

(56) References Cited

U.S. PATENT DOCUMENTS

2009/0070694 A1* 3/2009 Ore et al. ...................... 715/764
2010/0240349 A1* 9/2010 Jung et al. .................. 455/414.1
2010/0265827 A1* 10/2010 Horn et al. .................... 370/241

FOREIGN PATENT DOCUMENTS

| CN | 101083549 A | 12/2007 |
| CN | 101296451 A | 10/2008 |
| CN | 101400107 A | 4/2009 |
| EP | 2043404 A1 | 4/2009 |

OTHER PUBLICATIONS

International Search Report with English Translation issued in PCT/Cn2010/076003 dated Nov. 4, 2010.
Supplementary European Search Report Issued in EP10818355.

(Continued)

*Primary Examiner* — Clemence Han
(74) *Attorney, Agent, or Firm* — Venable LLP; Robert S. Babayi (57) ABSTRACT

The present invention provides a method for processing terminal membership based on a hybrid access mode cell, which method comprises: when the CSG member state of a terminal changes to a new CSG member state, a core network or a HNB gateway informing an access network element of the information about the new CSG member state; and the access network element processing the terminal according to information about the new CSG member state. The present invention further provides a system for processing terminal membership based on a hybrid access mode cell. In the present invention, when the subscription information changes when a terminal is in the connected state, not only the subscription information stored in the terminal and the core network or the HNB gateway is changed, but also the access network element which it accesses modifies its access identity to be a new CSG member state, thus the non-subscribed users and the subscribers can be processed differently and accurately.

17 Claims, 6 Drawing Sheets

(56) References Cited

OTHER PUBLICATIONS

Huawei et al: "Hybrid mode handling in Service Request procedure and Insert Subscriber Data procedure", 3GPP Draft; S2-094416 Hybrid Mode Handling in Service Request Procedure and Insert Subscriber Data Procedure, 3rd Generation Partnership Project (3GPP), Mobile Competence Centre ; 650, Route Des Lucioles ; F-06921 Sophia-Antipolis Cedex ; France,no. Sophia; Jun. 29, 2009.
Nortel: "Admission control and rate control for hybrid access mode", 3GPP Draft; 52-091782_E-MAIL_REV4_0F_52-091573_WAS1293_HENB_ADM_CTRL, 3rd Generation Partnership Project (3GPP), Mobile Competence Centre ; 650, Route Des Lucioles ; F-06921 Sophia-Antipolis Cedex ; France, vol. SA WG2, no. Budapest, Hungary; Feb. 16, 2009-Feb. 20, 2009, Mar. 3, 2009.
Huawei: "Allowed CSG List handling", 3GPP Draft; S2-092653 WAS S2-092208_Allowed CSG List Handling, 3rd Generation Partnership Project (3GPP), Mobile Competence Centre ; 650, Route Des Lucioles ; F-06921 Sophia-Antipolis Cedex ; France, vol. SA WG2, no. Hangzhou; Mar. 30-Apr. 3, 2009, Apr. 3, 2009.
Huawei: "CSG membership indication for hybrid access mode HNB", 3GPP Draft; S2-093329, 3rd Generation Partnership Project (3GPP), Mobile Competence Centre ; 650, Route Des Lucioles ; F-06921 Sophia-Antipolis Cedex ; France, no. Tallinn; May 5, 2009.
Zte et al: "Impact on established communications because of changes of the CSG membership status at Hybrid Mode H(e)NB", 3GPP Draft; S2-093221, 3rd Generation Partnership Project (3GPP), Mobile Competence Centre ; 650, Route Des Lucioles ; F-06921 Sophia-Antipolis Cedex ; France, no. Tallinn; May 5, 2009.

* cited by examiner

METHOD AND SYSTEM FOR PROCESSING TERMINAL MEMBERSHIP BASED ON HYBRID ACCESS MODE CELL

FIELD OF THE INVENTION

The present invention relates to the communication field, and in particular relates to a method and a system for processing terminal membership based on hybrid access mode cell.

BACKGROUND OF THE INVENTION

Figure 1:
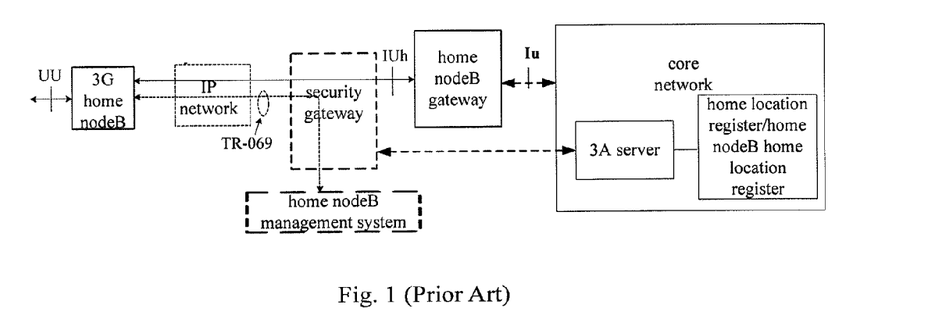
FIG. 1 shows a diagram of the system network structure of a HNB in the prior art.

Home NodeB (HNB) is a small base station with low power and deployed inside premises such as houses, offices, etc. The main function of HNB is to provide higher service rates for the subscribers and reduce fees needed when using high-rate servings, and at the same time to make up the blackout points in the existing distributed cellular wireless communication coverage. A HNB subscriber is connected into a core network (CN) via a HNB access network (HNB AN), wherein the HNB AN consists of a HNB and a HNB gateway (HNB GW). The HNB GW mainly executes the following functions: verifying security of the HNB, processing registration and access control of the HNB, and being responsible for exchanging data between the core network and the HNB. A HNB management system (HMS) performs running maintenance management to the HNB, configures and controls the HNB according to requirements of operators, and mostly performs the configuration management function for the HNB. The configuration management function includes verification of location information and performing parameter configuration to the HBN, which mainly relates to the parameter configuration of CN level, the parameter configuration at the radio access network (RAN) side, and the parameter configuration of radio frequency (RF). FIG. 1 shows a diagram of the system network structure of the HNB.

With the development of HNB technology, the concept of close subscriber group (CSG) is introduced to perform grouping management to the subscribers. With the introduction of the CSG concept, the HNB correspondingly introduces a concept of cell access mode for the CSG. There are three kinds of CSG HNB access modes: Open access mode, Close access mode, and Hybrid access mode. In this case, an HNB in the Open access mode allows the access of subscribed and non-subscribed users, and there is no difference from a normal macro cell. An HNB in the Close access mode only allows the access of users who have subscribed to this CSG. While an HNB in the Hybrid access mode allows the access of subscribed and non-subscribed users simultaneously, but the subscribed users are superior to the non-subscribed users. And on the premise that the resources are limited, the HNB serves the subscribers prior to the non-subscribed users and may switch the non-subscribed users to other cells or releases their signaling connections.

Consequently, as to those CSG cells in the Hybrid mode, when the access of a terminal (also can be referred to as user equipment, abbreviated as UE) is successful, as a network element implementing access control, the HNB GW or CN needs to inform the HNB of the access identity of the terminal, i.e. identity information of whether it is a subscribed user (or member identity information), so that the HNB can process the subscribers and the non-subscribed users differently. However, as to a terminal having signaling connections, its subscription information may change. As to a terminal supporting CSG, the change of its subscription information will be reflected on both of the core network and the terminal. That is, the change of its subscription information will respectively cause the synchronized updating of the allowed CSG lists stored at the core network side and the terminal side, wherein the allowed CSG lists are used for performing access control to the terminal. As to the situation of the HNB in the Hybrid mode, if the CSG of the subscribed terminal is in the list, then it is deemed that the terminal accesses the HNB as a subscriber, otherwise it accesses the HNB as a non-subscribed user. As to a terminal which does not support CSG, the change of its subscription information is reflected in a corresponding allowed access terminal IMSI list of the HNB to which it subscribes, and the HNB gateway uses this list to perform access control to the terminal. When a terminal which does not support CSG accesses a Hybrid mode HNB, if the IMSI of the terminal is in this list, then it is deemed that the terminal accesses as subscriber, otherwise it accesses as non-subscriber.

The inventors discover that there are at least the following problems in the prior art: the change of the subscription information of a terminal only is reflected on the change of the subscription information content stored in the terminal and HNB gateway or core network, and the HNB is informed of the subscription information of the terminal only when the terminal initially accesses it. However, when the subscription identity of the connected terminal changes, the HNB is unable to timely learn the change and process the terminal according to its new subscription identity. For example, as to a situation that a terminal accesses a Hybrid mode HNB, if the terminal did not subscribe to the CSG to which this HNB belongs when it initially accessed, then it accesses as non-subscriber, and when the terminal is in the connected state and it re-subscribes to this CSG, only its subscription information changes and the HNB which it accesses still processes it as non-subscriber. The same problem still exists after the CSG concept is introduced into the macro base station system.

SUMMARY OF THE INVENTION

The present invention is intended to provide a method and a system for processing terminal membership based on a hybrid access mode cell, so as to solve the problem in the prior art that when the subscription identity of a connected terminal changes, the HNB or RNC is unable to timely learn the change and process the terminal according to its new subscription identity.

A method for processing terminal membership based on a hybrid access mode cell is provided according to one aspect of the present invention, comprising: when a CSG member state of a terminal changes to a new CSG member state, a core network or a HNB gateway informs an access network element of the information about the new CSG member state; and the access network element processing the terminal according to this information.

Preferably, the access network element refers to a control network element controlling the hybrid access mode cell, the access network element is a HNB in a HNB system, and the access network element is a radio network controller in a macro base station system.

Preferably, the information about CSG member state is information indicating whether a terminal is a CSG subscriber of a hybrid access mode cell which it accesses.

Preferably, said core network or said HNB gateway informing the access network element of the information about the new CSG member state comprises: when a terminal supports CSG, the core network informing an access network element of the information about the new CSG member state by a RANAP (radio access network application part) message.

Preferably, the core network informing the access network element of the information about the new CSG member state by the RANAP message comprises: the core network determining the mode of the cell which the terminal accesses is Hybrid mode; the core network determining the new CSG member state of the terminal in this cell according to a stored allowed CSG list; and the core network sending a RANAP message carrying the information about the new CSG member state to the access network element.

The access network element processing the terminal according to the information comprises: the access network element recording the received information about the new CSG member state in the RANAP message; and the access network element performing access control to the terminal as the new CSG member state according to this information.

In this case, the RANAP message is a direct information transfer message, a radio access bearer (RAB) assignment request message, a terminal UE specific information indication message, a direct transfer message or a newly added RANAP message.

Preferably, said core network or said HNB gateway informing the access network element of the information of the new CSG member state further comprises: when the terminal does not support CSG, the HNB gateway informing the HNB of the new CSG member state by a HNB application part terminal HNBAP UE registration acceptance message, a newly added HNBAP message, a RANAP adapted RUA direct transfer message or a RUA encapsulated RANAP message; wherein, the RANAP message in the RUA encapsulated RANAP message is a direct information transfer message, a RAB assignment message, a UE specific information indication message, a direct transfer message or a newly added RANAP message.

Preferably, the HNB gateway informing the HNB of the information about the new CSG member state by the HNBAP UE registration acceptance message, the newly added HNBAP message, the RUA direct transfer message or the RUA encapsulated RANAP message comprises: when the mode of the HNB cell which the terminal accesses is Hybrid mode, a corresponding HNB gateway determining the new CSG member state of the terminal in this HNB cell according to an allowed IMSI list; the HNB gateway sending the HNBAP UE registration acceptance message, the newly added HNBAP message, the RUA direct transfer message or the RUA encapsulated RANAP message carrying the information about the new CSG member state to the HNB.

The access network element processing the terminal according to the information comprises: the HNB recording the information about the new CSG member state in the received HNBAP UE registration acceptance message, the newly added HNBAP message, the RUA direct transfer message or the RUA encapsulated RANAP message; and the HNB performing access control to the terminal with the new CSG member state according to this information.

Optionally, in the above method for processing terminal membership, it further comprises: when the CSG member state of the terminal changes to the new CSG member state, the HNB gateway informing the core network of the information about the new CSG member state by a RANAP message.

In this case, the RANAP message is a direct transfer message, an uplink information exchange request message or a newly added RANAP message.

A system for processing terminal membership based on hybrid access mode cell is provided according to another aspect of the present invention, comprising: a core network or a HNB gateway, for, when a CSG member state of a terminal changes to a new CSG member state, informing an access network element of the information about the new CSG member state; and an access network element for processing the terminal according to the information about the new CSG member state.

Preferably, the access network element refers to a control network element controlling the hybrid access mode cell, the access network element is a HNB in a HNB system, and the access network element is a radio network controller in a macro base station system.

Preferably, when the terminal supports CSG, the core network is used for informing the access network element of information about the new CSG member state by a RANAP message.

Preferably, the core network informing the access network element of the information about the new CSG member state by a RANAP message comprises: the core network determining the mode of a cell which the terminal accesses is Hybrid mode; the core network determining the new CSG member state of the terminal in this cell according to a stored allowed CSG list; and the core network sending a RANAP message carrying the information about the new CSG member state to the access network element.

The access network element processing the terminal according to this information comprises: the access network element recording the information about the new CSG member state received in the RANAP message; and the access network element performing access control to the terminal according to the new CSG member state.

Preferably, when the terminal does not support CSG, the HNB gateway is used to inform the HNB of the information about the new CSG member state by a HNBAP UE registration acceptance message, a newly added HNBAP message, a RUA direct transfer message or a RUA encapsulated RANAP message. Wherein, the RANAP message in the RUA encapsulated RANAP message is a direct information transfer message, a RAB assignment message, a UE specific information indication message, a direct transfer message or a newly added RANAP message.

Preferably, the HNB gateway informing the HNB of the information about the new CSG member state by the HNBAP UE registration acceptance message, the newly added HNBAP message, the RUA direct transfer message or the RUA encapsulated RANAP message comprises: when the terminal accesses a HNB cell of the Hybrid access mode, a corresponding HNB gateway determining the new CSG member state of the terminal in this HNB cell according to an allowed IMSI list; the HNB gateway sending the HNBAP UE registration acceptance message, the newly added HNBAP message, the RUA direct transfer message or the RUA encapsulated RANAP message carrying the information about the new CSG member state to the HNB.

The access network element processing the terminal according to the information comprises: the HNB recording the information about the new CSG member state in the received HNBAP UE registration acceptance message, the newly added HNBAP message, the RUA direct transfer message or the RUA encapsulated RANAP message; and the HNB performing access control to the terminal with the new CSG member state according to this information.

Optionally, the HNB gateway is further used for, when the CSG member state of a terminal changes to a new CSG member state, informing the core network of the information about the new CSG member state by a RANAP message.

Since as long as the CSG member state information of a terminal changes, the core network or the HNB gateway will inform the HNB (or RNC (radio network controller)) of the information about the new CSG member state of the terminal, the HNB (or RNC) can process the terminal according to the information about its new CSG member state. Thus, the above stated method solves the problem in the prior art that the HNB (or RNC) is unable to timely learn the change and process the terminal according to its new subscription identity when the subscription identity of the connected terminal changes. When a connected terminal changes its subscription information, not only the subscription information stored in terminal and the core network or the HNB gateway is changed, but also the HNB (or RNC) which the terminal accesses can change its access identity to the new CSG member state. As a result, the non-subscribed users and the subscribers can be processed differently and accurately.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention will be described hereinafter in detail with reference to the drawings and in combination with the embodiments.

Figure 2:
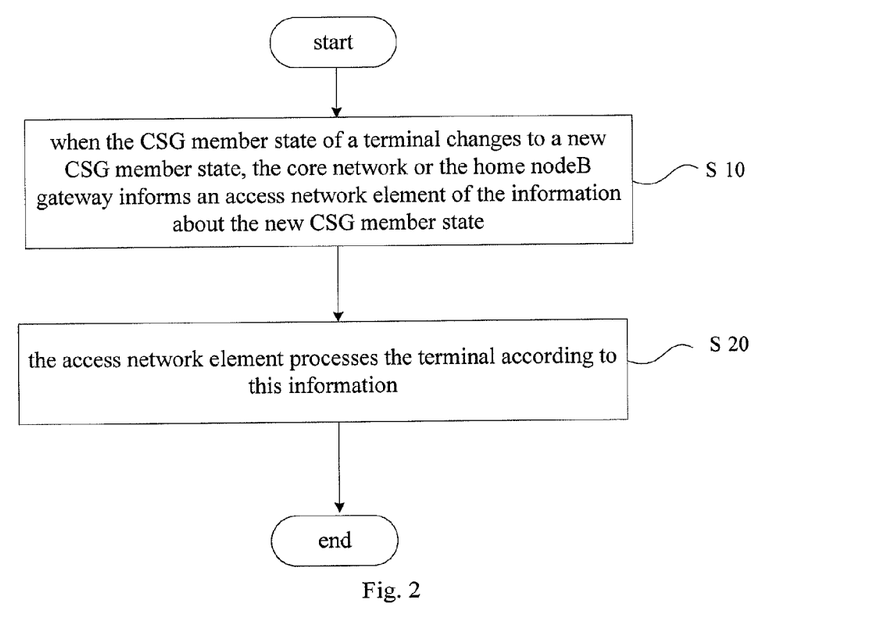
FIG. 2 shows a flow chart of a method for processing terminal membership based on hybrid access mode cell according to the embodiments of the present invention.

FIG. 2 shows a flow chart of a method for processing terminal membership based on a hybrid access mode cell according to the embodiments of the present invention, and it comprises the following steps:

Step S10: When the CSG member state of a terminal changes to a new CSG member state, a core network or a HNB gateway informs an access network element of the information about the new CSG member state; and Step S20: The access network element processes the terminal according to this information, for example, the access network element can perform an access control process according to this information.

In this case, the access network element refers to a control network element controlling the hybrid access mode cell, the access network element is a HNB in a HNB system, and the access network element is a RNC (radio network controller) in a macro base station system. In the situation that the CSG concept is introduced into a macro cell, it needs to inform the RNC of this information, and the RNC processes the terminal according to the new CSG member state information after having received this new information and recorded it. The access network element in the HNB system refers to a HNB.

The information about the CSG member state is information indicating whether the terminal is a CSG subscribed subscriber of the hybrid access mode cell which it accesses, which is equivalent to the subscription identity information or member identity information of a subscriber, and additionally, when the terminal appears as a subscriber, it can be deemed that the terminal appears with Close mode being its access mode, otherwise it appears in Open mode. There is no essential difference among these three kinds of information, which are represented as the CSG member state in the present invention but are not limited to the present invention.

In this preferred embodiment, as long as the CSG member state information of the terminal changes, the core network or the HNB gateway will inform the access network element of the information about the new CSG member state of the terminal, the access network element can process the terminal according to the information about its new CSG member state, which solves the problem in the prior art that the HNB (or RNC) (i.e. access network element) is unable to timely learn the change and process the terminal according to its new subscription identity when the subscription identity of the connected terminal changes. Thus, if a terminal is in the connected state, when the subscription information changes, not only the subscription information stored in the terminal and the core network or the HNB gateway changes, but also the access network element which it accesses modifies its access identity to be a new CSG member state, and thus the non-subscribed users and the subscribers can be processed differently and accurately. At the same time, it solves the same problem existing in a macro base station system when the CSG concept is introduced into it.

In the present invention, the subscription identity information is described as CSG member state.

Preferably, step S10 includes: when a terminal supports CSG, the core network informs an access network element (HNB or RNC) of the information about the new CSG member state by a RANAP (Radio Access Network Application Part) message. The core network informing the access network element of the information about the new CSG member state by a RANAP message includes: the core network determining the mode of a cell which the terminal accesses is Hybrid mode; the core network determining the new CSG member state of the terminal in this cell according to a stored allowed CSG list; the core network sending a RANAP message carrying the information about the new CSG member state to the access network element; and step S20 includes: the access network element recording the received information about the new CSG member state carried in the RANAP message; and the access network element performing access control to the terminal with the new CSG member state according to this information.

In this case, the RANAP message can be a direct information transfer message, a RAB assignment request message, a UE specific information indication message (i.e. UE specific information indication message), a direct transfer message or a newly added RANAP message.

This preferred embodiment provides a particular embodiment of the present invention when the UE supports CSG.

Preferably, step S10 includes: when a terminal does not support CSG, the HNB gateway informs the HNB (at this moment, the access network element is the HNB) of the information about the new CSG member state by a HNBAP (HNB application part) UE registration acceptance message, a newly added HNBAP message, a RUA (RANAP user adaption) direct transfer message or a RUA encapsulated RANAP message; wherein the RANAP message in the RUA encapsulated RANAP message is a direct information transfer message, a RAB assignment message, a UE specific information indication message, a direct transfer message or a newly added RANAP message.

The HNB gateway informing the HNB of the information about the new CSG member state by the HNBAP UE registration acceptance message, the newly added HNBAP message, the RUA direct transfer message or the RUA encapsulated RANAP message includes: when the mode of the HNB cell which a terminal accesses is Hybrid mode, the corresponding HNB gateway determining the new CSG member state of the terminal in this HNB cell according to the allowed IMSI list; the HNB gateway sending a HNBAP UE registration acceptance message, a newly added HNBAP message, a RUA direct transfer message or a RUA encapsulated RANAP message carrying the information about the new CSG member state to the HNB; and step S20 includes: the HNB recording the received information about the new CSG member state in the HNBAP UE registration acceptance message, the newly added HNBAP message, the RUA direct transfer message or the RUA encapsulated RANAP message; and the HNB performing access control to the terminal with the new CSG member state according to this information.

This preferred embodiment provides another particular embodiment of the present invention when the UE does not support CSG.

Optionally, in the above situation that the terminal does not support CSG, the above method for processing terminal membership further comprises: when the CSG member state of the terminal changes to a new CSG member state, the HNB gateway informing the core network of the information about the new CSG member state by a RANAP message.

In this case, the RANAP message can be a direct transfer message, an uplink information exchange request message or a newly added RANAP message for indicating the UE subscription identity information.

This preferred embodiment provides that when the UE is a UE not supporting CSG, the HNB gateway still can inform the core network of the information about the new CSG member state of the terminal so as to perform the subsequent charging, etc.

The present invention mainly comprises the following aspects:

1) As to the UE supporting CSG, the core network informs the access network element (HNB or RNC) of the information about the new CSG member state of the UE by a RANAP message, and the access network element will use the new CSG member state information after having received this information.

In this case, the CSG member state information includes the information indicating whether the UE is a CSG subscribed subscriber of the Hybrid cell which it has already accesses; and the RANAP message can be a direct information transfer message, a RAB assignment request message, a UE specific information indication message, a direct transfer message or a newly added RANAP message.

2) If the UE does not support CSG, the HNB gateway informs the HNB of the new CSG member state information of the UE in the situation that the CSG member state information of the UE changes, and the HNB uses the new CSG member state information after having received the information.

In this case, the HNB gateway can transfer the new CSG member state information by a HNBAP UE registration acceptance message, a newly added HNBAP message, a RUA direct transfer message or a RUA encapsulated RANAP message; if the new CSG member state information of the UE is transferred by the RUA encapsulated RANAP message, then the RANAP message therein can be a direct information transfer message, a RAB assignment request message, a UE specific information indication message, a direct transfer message or a newly added RANAP message.

Optionally, as to the UE not supporting CSG, the HNB gateway informs the core network of the new CSG member state of the UE in the situation that the CSG member state information of the UE changes, and the core network uses the new CSG member state information after having received the information.

In this case, the RANAP message is a direct transfer message, an uplink information exchange request message or a newly added RANAP message for indicating the UE subscription identity information.

The following embodiments describe the two situation of a terminal supporting CSG and not supporting CSG accessing a Hybrid cell respectively. As to a terminal supporting CSG, when the CSG member state information of the terminal changes, the core network informs the HNB or RNC of the new CSG member state information; as to a terminal not supporting CSG, when the CSG member state information of the terminal changes, the HNB gateway informs the HNB of the new CSG member state information; and additionally as to the situation of HNB gateway, the HNB gateway can also inform the core network of the new CSG member state information.

Embodiment 1

Figure 3:
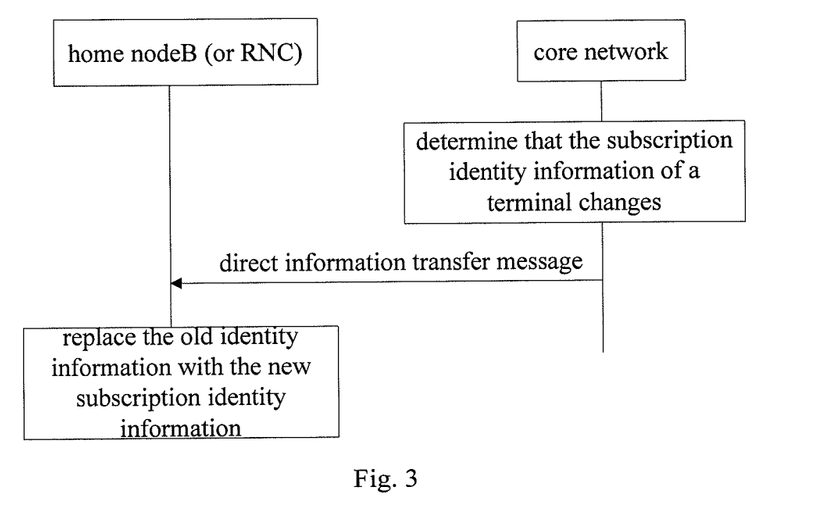
FIG. 3 shows a schematic diagram of a core network transferring the changed subscription identity information of UE by a direct information transfer message according to the preferred embodiments of the present invention.

As to a terminal supporting CSG, when the CSG member state of the terminal changes after the terminal accesses a Hybrid cell, the core network informs the HNB or RNC of the new CSG member state information by a direct information transfer message. As shown in FIG. 3, its process is as follows:

when the subscription information of a terminal changes, if the core network determines that this terminal currently accesses a Hybrid cell, then the core network determines the new CSG member state of this terminal in the cell according to the new subscription information and sends a direct information transfer message carrying the new CSG member state information. After having received this message, the HNB or RNC records the information about the new CSG member state of the UE.

Embodiment 2

Figure 4:
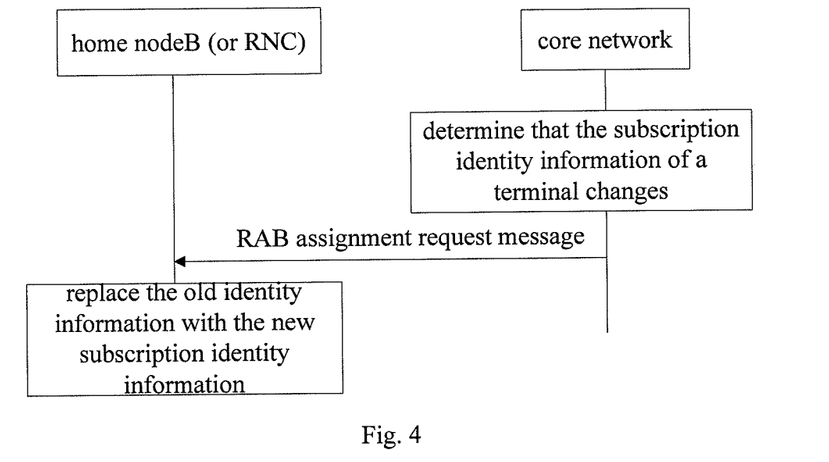
FIG. 4 shows a schematic diagram of a core network transferring the changed subscription identity information of UE by a RAB assignment request message according to the preferred embodiments of the present invention.

As to a terminal supporting CSG, when the CSG member state of the terminal changes after the terminal accesses a Hybrid cell, the core network informs the HNB or RNC of the information about the new CSG member state by a RAB assignment request message. As shown in FIG. 4, its process is as follows:

When the subscription information of a terminal changes, if the core network determines that this terminal currently accesses a Hybrid cell, then the core network determines the new CSG member state of this terminal in this cell according to the new subscription information and sends a RAB assignment request message carrying the new CSG member state information. After having received this message, the HNB or RNC records the new CSG member state information of the UE.

Embodiment 3

Figure 5:
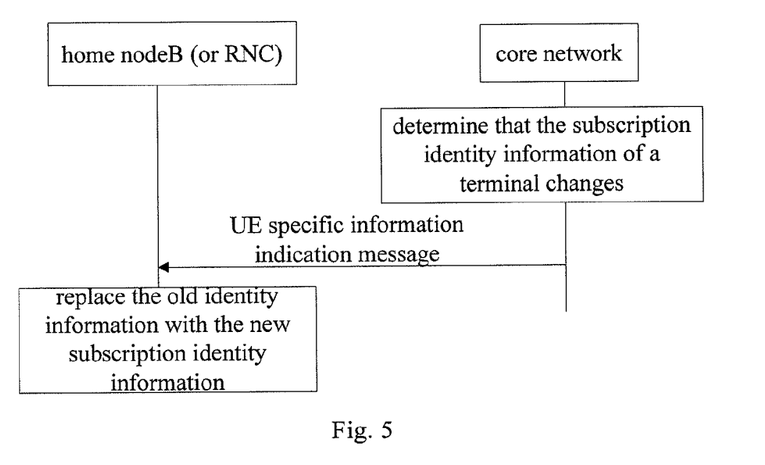
FIG. 5 shows a schematic diagram of a core network transferring the changed subscription identity information of UE by a UE specific information indication message according to the preferred embodiments of the present invention.

As to a terminal supporting CSG, when the CSG member state of the terminal changes after the terminal accesses a Hybrid cell, the core network informs the HNB or RNC of the new CSG member state information by a UE specific information indication message. As shown in FIG. 5, its process is as follows:

when the subscription information of a terminal changes, if the core network determines that this terminal currently accesses a Hybrid cell, then the core network determines the new CSG member state of this terminal in this cell according to the new subscription information and sends a UE specific information indication message carrying the new CSG member state information. After having received this message, the HNB or RNC records the information about the new CSG member state information of the UE.

Embodiment 4

Figure 6:
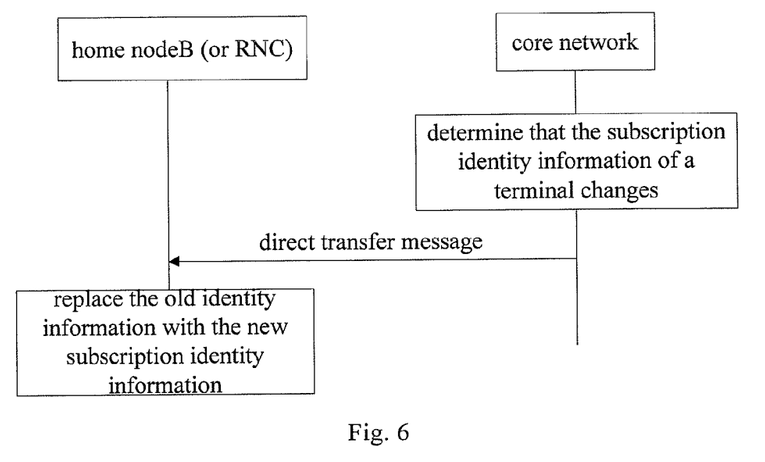
FIG. 6 shows a schematic diagram of a core network transferring the changed subscription identity information of UE by a direct transfer message according to the preferred embodiments of the present invention.

As to a terminal supporting CSG, when the CSG member state of the terminal changes after the terminal accesses a Hybrid cell, the core network informs the HNB or RNC of the new CSG member state information by a direct transfer message. As shown in FIG. 6, its process is as follows:

when the subscription information of a terminal changes, if the core network determines that this terminal currently accesses a Hybrid cell, then the core network determines the new CSG member state of this terminal in this cell according to the new subscription information and sends a direct transfer message carrying the new CSG member state information. After having received this message, the HNB or RNC records the new CSG member state information of the UE.

Embodiment 5

Figure 7:
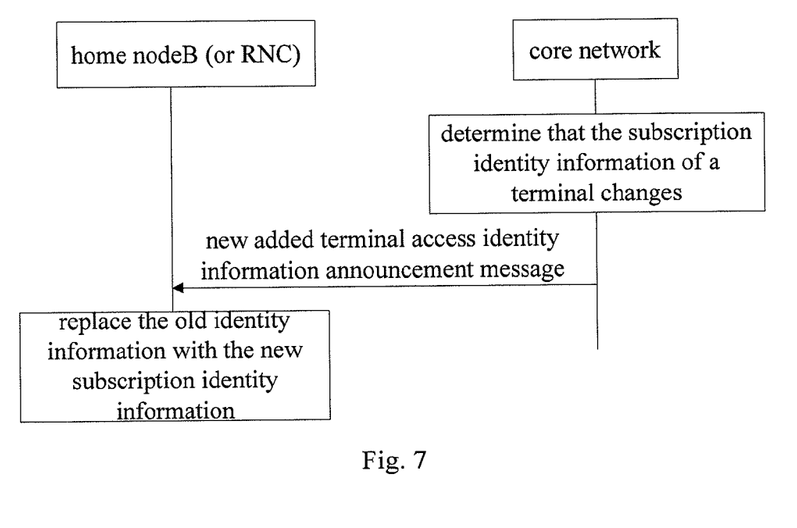
FIG. 7 shows a schematic diagram of a core network transferring the changed subscription identity information of UE by a newly added message according to the preferred embodiments of the present invention.

As to a terminal supporting CSG, when the CSG member state of the terminal changes after the terminal accesses a Hybrid cell, the core network informs the HNB or RNC of the new CSG member state information by a newly added terminal access identity announcement message. As shown in FIG. 7, its process is as follows:

when the subscription information of a terminal changes, if the core network determines that this terminal currently accesses a Hybrid cell, then the core network determines the new CSG member state of this terminal in this cell according to the new subscription information and sends a newly added terminal access identity announcement message carrying the new CSG member state information to the HNB or RNC. After having received this message, the HNB or RNC records the new CSG member state of the UE.

Embodiment 6

Figure 8:
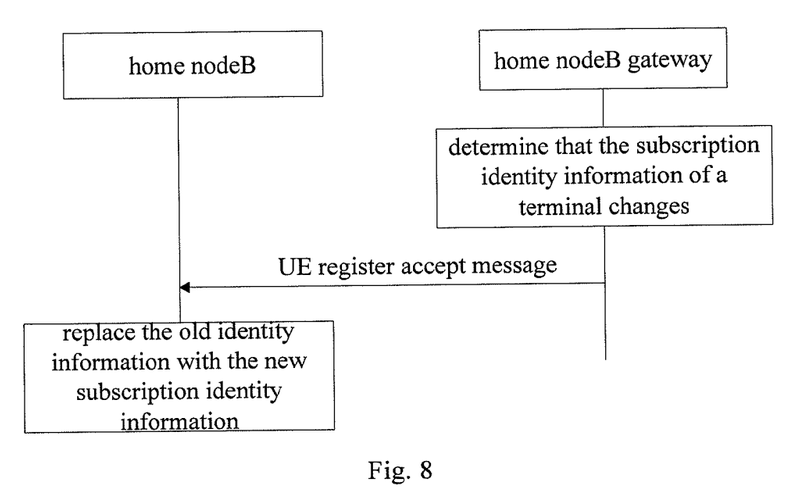
FIG. 8 shows a schematic diagram of a HNB gateway transferring the changed subscription identity information of UE by a HNBAP message according to the preferred embodiments of the present invention.

As to a terminal not supporting CSG, when the CSG member state of the terminal changes after the terminal accesses a Hybrid cell, the HNB gateway informs the HNB of the new CSG member state information by a HNBAP message. As shown in FIG. 8, its procedure is as follows:

when the subscription information of a terminal is to be updated, an operation management system updates a new allowed IMSI list of the HNB into the HNB gateway. When the HNB is a Hybrid cell, the HNB gateway determines the new CSG member state of the terminal in the cell according to the new subscription information and sends a UE registration acceptance message carrying the new CSG member state to the HNB. After having received this message, the HNB records the new CSG member state information of the UE.

The above embodiments can inform the HNB of the new CSG member state message of the UE by a newly added downlink HNBAP message, which will not be described in detail.

Embodiment 7

Figure 9:
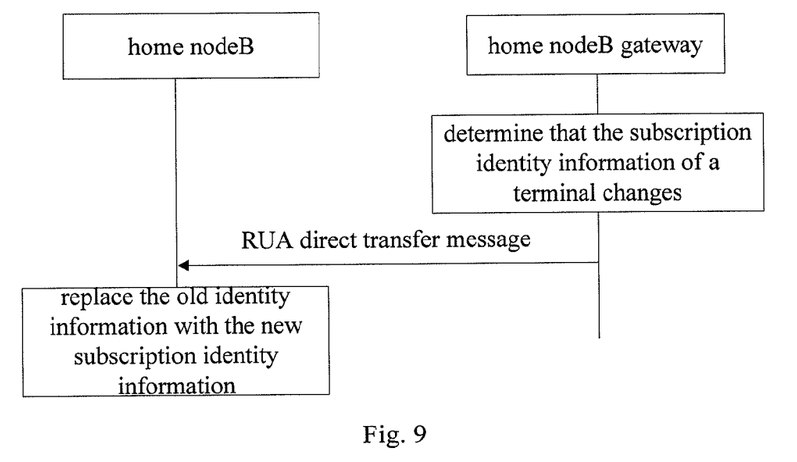
FIG. 9 shows a schematic diagram of a HNB gateway transferring the changed subscription identity information of UE by a RUA message according to the preferred embodiments of the present invention.

As to a terminal not supporting CSG, when the CSG member state of the terminal changes after the terminal accesses a Hybrid cell, the HNB gateway informs the HNB of the new CSG member state information by a RUA message. As shown in FIG. 9, its procedure is as follows:

when the subscription information of a terminal is to be updated, an operation management system updates a new allowed IMSI list of the HNB into the HNB gateway. When the HNB is a Hybrid cell, the HNB gateway determines the new CSG member state of the terminal in the cell according to the new subscription information and sends a RUA direct transfer message carrying the new CSG member state information to the HNB. After having received this message, the HNB records the new CSG member state information of the UE.

Embodiment 8

Figure 10:
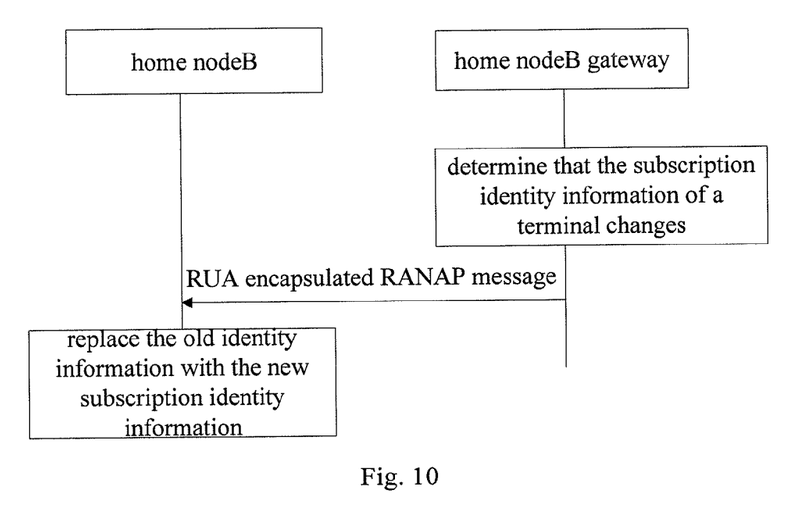
FIG. 10 shows a schematic diagram of a HNB gateway transferring the changed subscription identity information of UE by a RANAP message according to the preferred embodiments of the present invention.

As to a terminal not supporting CSG, when the subscription identity of the terminal changes after the terminal accesses a Hybrid HNB cell, the HNB gateway informs the HNB of the new CSG member state information by modifying the RANAP message in the RUA message. As shown in FIG. 10, its procedure is as follows:

when the subscription information of a terminal is to be updated, an operation management system updates a new allowed IMSI list of the HNB into the HNB gateway. When the HNB is a Hybrid cell, the HNB gateway determines the new subscription identity of the terminal in the cell according to the new subscription information, and adds the new CSG member state information of the UE into this RANAP message after having received a RANAP message direct information transfer from the core network and transfers this message to the HNB by encapsulating this message by the RUA. After having received the RUA message, the HNB resolves the RANAP message therein and records the information about the new CSG member state of the UE.

The RANAP message described in the above embodiments can also be a RAN assignment request message, a UE specific information indication message, a direct transfer message, or a newly added RANAP message for indicating UE subscription information.

Embodiment 9

Figure 11:
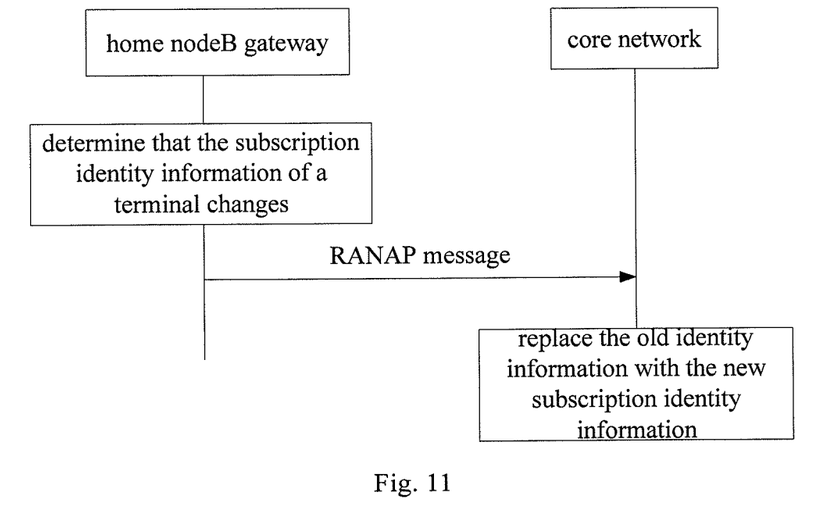
FIG. 11 shows a schematic diagram of a HNB gateway transferring the changed subscription identity information of UE by a RANAP message to a core network according to the preferred embodiments of the present invention.

As to a terminal not supporting CSG, when the CSG member state of the terminal changes after the terminal accesses a Hybrid cell, the HNB gateway informs the core network of the new CSG member state information of the terminal. As shown in FIG. 11, its procedure is as follows:

when the subscription information of a terminal is to be updated, an operation management system updates a new allowed IMSI list of the HNB into the HNB gateway. When the HNB is a Hybrid cell, if the HNB finds that the subscription information of the UE changes, then after having received a RUA message from the HNB, it resolves the RANAP message therein, and if this message is direct information transfer, the new CSG member state information of the UE is added into this RANAP message, and this message is sent to the core network, and the core network resolves this RANAP message and records the new CSG member state information of the UE.

The RANAP message described in the above embodiments can also be a direct transfer message, an uplink information exchange request message, or a newly added RANAP message for indicating the CSG member state information of the UE.

A system for processing terminal membership based on a hybrid access mode cell is further provided according to another aspect of the present invention. This system comprises: a core network or a HNB gateway for, when the CSG member state of a terminal changes to a new CSG member state, informing an access network element of the information about the new CSG member state; and an access network element for processing the terminal according to this information.

In this case, the access network element refers to a control network element controlling a hybrid access mode cell, the access network element is a HNB in a HNB system, and the access network element is a RNC (radio network controller) in a macro base station system. In the situation that the CSG concept is introduced into a macro cell, it needs to inform RNC of this information. RNC processes the terminal according to the new CSG member state information after having received this new information and recorded it. The access network element in the HNB system refers to a HNB.

The information about the CSG member state is information indicating whether the terminal is a CSG subscribed subscriber of the hybrid access mode cell which it accesses, which is equivalent to the subscription identity information or member identity information of a subscriber, and additionally, when the terminal appears as a subscriber, it can be deemed that the terminal appears with Close mode being its access mode, otherwise it appears in Open mode. There is no essential difference among the three kinds of information, which are represented as the CSG member state in the present invention but are not limited to the present invention.

In this preferred embodiment, as long as the CSG member state information of the terminal changes, the core network or the HNB gateway will inform the access network element of the information about the new CSG member state of the terminal, the access network element can process the terminal according to the information about its new CSG member state, which solves the problem in the prior art that the HNB (or RNC) is unable to timely learn the change and process the terminal according to its new subscription identity when the subscription identity of the connected terminal changes. Thus, if a terminal is in the connected state, when the subscription information changes, not only the subscription information stored in the terminal and the core network or the HNB gateway changes, but also the access network element which it accesses modifies its access identity to be a new CSG member state, and thus the non-subscribed users and the subscribers can be processed differently and accurately. In the present invention, the subscription identity information is described as CSG member state.

Preferably, as shown in FIGS. 3 to 7, when the terminal supports CSG, the core network is used for informing the access network element (HNB or RNC) of the information about the new CSG member state by a RANAP message. The core network informing the access network element of the information about the new CSG member state by a RANAP message includes: the core network determining the mode of a cell which the terminal accesses is Hybrid mode; the core network determining the new CSG member state of the terminal in this cell according to a stored allowed CSG list; the core network sending a RANAP message carrying the information about the new CSG member state to the access network element; the access network element processing the terminal according to the information includes: the access network element recording the received information about the new CSG member state carried in the RANAP message; and the access network element performing access control to the terminal with the new CSG member state according to this information.

In this case, the RANAP message can be a direct information transfer message, a RAB assignment request message, a UE specific information indication message, a direct transfer message or a newly added RANAP message.

This preferred embodiment provides a particular embodiment of the present invention when the UE is the UE supporting CSG.

Preferably, as shown in FIGS. 8 to 10, when the terminal does not support CSG, the HNB gateway is used for informing the HNB (at this moment, the core network network element is the HNB) of the information about the new CSG member state by a HNBAP UE registration acceptance message, a newly added HNBAP message, a RUA direct transfer message or a RUA encapsulated RANAP message, wherein the RANAP message in the RUA encapsulated RANAP message is a direct information transfer message, a RAB assignment message, a UE specific information indication message, a direct transfer message or a newly added RANAP message.

Preferably, the HNB gateway informing the HNB of the information about the new CSG member state by the HNBAP UE registration acceptance message, the newly added HNBAP message, the RUA direct transfer message or the RUA encapsulated RANAP message includes: when the mode of the HNB cell which a terminal accesses is Hybrid mode, the corresponding HNB gateway determining the new CSG member state of the terminal in this HNB cell according to the allowed IMSI list; the HNB gateway sending a HNBAP UE registration acceptance message, a newly added HNBAP message, a RUA direct transfer message or a RUA encapsulated RANAP message carrying the information about the new CSG member state to the HNB; and the access network element processing the terminal according to the information includes: the HNB recording the received information about the new CSG member state in the HNBAP UE registration acceptance message, the newly added HNBAP message, the RUA direct transfer message or the RUA encapsulated RANAP message; and the HNB performing access control to the terminal as the new CSG member state according to this information.

This preferred embodiment provides another particular embodiment of the present invention when the UE is the UE not supporting CSG.

Optionally, as shown in FIG. 11, the HNB gateway is further used for, when the CSG member state of a terminal changes to a new CSG member state, informing the core network of the information about the new CSG member state by a RANAP message.

In this case, the RANAP message is a direct transfer message, an uplink information exchange request message or a newly added RANAP message for indicating the UE CSG member state information.

This preferred embodiment provides that when the UE does not support CSG, the HNB gateway still can inform the core network of the information about the new CSG member state of the terminal so as to perform the subsequent charging, etc.

It can be seen from the above description that the present invention achieves the following technical effects: if the CSG member state information of a terminal changes, then the core network or the HNB gateway will inform an access network element of the information about the new CSG member state of the terminal, and the access network element can process the terminal according to the information about its new CSG member state. Thus, this method solves the problem in the prior art that the access network element is unable to timely learn the change and process the terminal according to its new subscription identity when the subscription identity of the connected terminal changes. When the subscription information of a connected terminal changes, not only the subscription information stored in terminal and the core network or the HNB gateway changes, but also the access network element which the terminal accesses changes its access identity to a new CSG member state. As a result, the non-subscribed users and the subscribers can be processed differently and accurately.

Apparently, those skilled in the art should understand that the above-mentioned modules and steps of the present invention can be realized by using general purpose calculating devices, and can be integrated in one calculating device or distributed on a network which consists of a plurality of calculating devices. Alternatively, they can be realized by using the executable program codes of the calculating devices, so that consequently they can be stored in storing devices and executed by the calculating devices, or they can be made into integrated circuit modules respectively, or a plurality of modules or steps thereof are made into one integrated circuit module. Thus, the present invention is not limited to the combination of any specific hardware and software.

The above description is only to illustrate the preferred embodiments, and does not constitute limitation of the present invention. To those skilled in the art, it is apparent that various alterations and changes can be made to the present invention. The scope defined in the present invention shall comprise any modification, equivalent substitution and improvement within the basic idea and principle of the present invention.

What is claimed is:

1. A method for processing terminal membership based on a hybrid access mode cell, comprising:
    when a close user group (CSG) member state of a terminal changes to a new CSG member state, a core network or a home node B (HNB) gateway informing an access network element of information about said new CSG member state; and
    said access network element processing said terminal according to said new CSG member information.

2. The method for processing terminal membership according to claim 1, wherein said access network element refers to a control network element controlling the hybrid access mode cell, said access network element is a HNB in a HNB system, and said access network element is a radio network controller in a macro base station system.

3. The method for processing terminal membership according to claim 2, wherein said core network or said HNB gateway informing the access network element of the information about said new CSG member state comprises:
    when said terminal supports CSG, said core network informing said access network element of the information about said new CSG member state by a radio access network application part (RANAP) message.

4. The method for processing terminal membership according to claim 3, wherein,
    said core network informing said access network element of the information about said new CSG member state by the RANAP message comprises:
    said core network determining that the mode of the cell which said terminal accesses is Hybrid mode;
    said core network determining the new CSG member state of said terminal in said cell according to a stored allowed CSG list; and
    said core network sending a RANAP message carrying the information about said new CSG member state to said access network element;
    said access network element processing said terminal according to said information comprises:
    said access network element recording said received information in said RANAP message; and
    said access network element performing access control to said terminal as said new CSG member state according to said information.

5. The method for processing terminal membership according to claim 3, wherein said RANAP message is a direct information transfer message, a radio access bearer (RAB) assignment request message, a terminal specific information indication message, a direct transfer message or a newly added RANAP message.

6. The method for processing terminal membership according to claim 1, wherein the information about said CSG member state is information indicating whether the terminal is a CSG subscribed subscriber of the hybrid access mode cell which the terminal accesses.

7. The method for processing terminal membership according to claim 2, wherein said core network or said HNB gateway informing the access network element of the information of said new CSG member state further comprises:
    when said terminal does not support CSG, said HNB gateway informing said HNB of the information about said new CSG member state by a HNB application part (HNBAP) terminal registration acceptance message, a newly added HNBAP message, a radio access network application part (RANAP) adapted RANAP user adaption (RUA) direct transfer message or a RUA encapsulated RANAP message;
    wherein, the RANAP message in said RUA encapsulated RANAP message is a direct information transfer message, a RAB assignment message, a UE specific information indication message, a direct transfer message or a newly added RANAP message.

8. The method for processing terminal membership according to claim 7, wherein,
said HNB gateway informing said HNB of the information about said new CSG member state by the HNBAP UE registration acceptance message, the newly added HNBAP message, the RUA direct transfer message or the RUA encapsulated RANAP message comprises:
when the mode of the HNB cell which said terminal accesses is Hybrid mode, said corresponding HNB gateway determining said new CSG member state of said terminal in said HNB cell according to an allowed international mobile subscriber identification number (IMSI) list; and
said HNB gateway sending said HNBAP UE registration acceptance message, said newly added HNBAP message, said RUA direct transfer message or said RUA encapsulated RANAP message carrying the information about said new CSG member state to said HNB;
said access network element processing said terminal according to said information comprises:
said HNB recording said information in said received HNBAP UE registration acceptance message, said newly added HNBAP message, said RUA direct transfer message or said RUA encapsulated RANAP message; and
said HNB performing access control to said terminal with said new CSG member state according to said information.

9. The method for processing terminal membership according to claim 7, further comprising:
when the CSG member state of the terminal changes to the new CSG member state, said HNB gateway informing said core network of the information about said new CSG member state by a RANAP message.

10. The method for processing terminal membership according to claim 9, wherein said RANAP message is a direct transfer message, an uplink information exchange request message or a newly added RANAP message.

11. A system for processing terminal membership based on hybrid access mode cell, wherein it comprises:
a core network or a HNB gateway for, when a close user group (CSG) member state of a terminal changes to a new CSG member state, informing an access network element of the information about said new CSG member state; and
said access network element for processing said terminal according to said new CSG member information.

12. The system for processing terminal membership according to claim 11, wherein said access network element refers to a control network element controlling the hybrid access mode cell, said access network element is a HNB in a HNB system, and said access network element is a radio network controller in a macro base station system.

13. The system for processing terminal membership according to claim 12, wherein, when said terminal supports close user group CSG, said core network is used for informing said access network element of information about said new CSG member state by a radio access network application part (RANAP) message.

14. The system for processing terminal membership according to claim 13, wherein,
said core network informing said access network element of the information about said new CSG member state by said RANAP message comprises:
said core network determining that the mode of the cell which said terminal accesses is Hybrid mode;
said core network determining the new CSG member state of said terminal in said cell according to a stored allowed CSG list; and
said core network sending said RANAP message carrying the information about said new CSG member state to said access network element;
said access network element processing said terminal according to said information comprises:
said access network element recording the received information about said new CSG member state in said RANAP message; and
said access network element performing access control to said terminal in said new CSG member state according to the information about said new CSG member state.

15. The system for processing terminal membership according to claim 12, wherein, when said terminal does not support CSG, said HNB gateway is used for informing said HNB of the information about said new CSG member state by a HNB application part (HNBAP) terminal registration acceptance message, a newly added HNBAP message, a radio access network application part (RANAP) adapted RANAP user adaption (RUA) direct transfer message or a RUA encapsulated RANAP message, wherein the RANAP message in said RUA encapsulated RANAP message is a direct information transfer message, a radio access bearer RAB assignment message, a UE specific information indication message, a direct transfer message a newly added RANAP message.

16. The system for processing terminal membership according to claim 15, wherein,
said HNB gateway informing said HNB of the information about said new CSG member state by the HNBAP UE registration acceptance message, the newly added HNBAP message, the RUA direct transfer message or the RUA encapsulated RANAP message comprises:
when the mode of the HNB cell which said terminal accesses is Hybrid mode, said corresponding HNB gateway determining said new CSG member state of said terminal in said HNB cell according to an allowed international mobile subscriber identification number (IMSI) list; and
said HNB gateway sending said HNBAP UE registration acceptance message, said newly added HNBAP message, said RUA direct transfer message or said RUA encapsulated RANAP message carrying the information about said new CSG member state to said HNB;
said access network element processing said terminal according to said information comprises:
said HNB recording said information in said received HNBAP UE registration acceptance message, said newly added HNBAP message, said RUA direct transfer message or said RUA encapsulated RANAP message; and
said HNB performing access control to said terminal with said new CSG member state according to said information.

17. The system for processing terminal membership according to claim 15, wherein said HNB gateway is further used for, when the CSG member state of said terminal changes to said new CSG member state, informing said core network of the information about said new CSG member state by a RANAP message.

* * * * *